(12) United States Patent
Bayer et al.

(10) Patent No.: US 10,650,126 B2
(45) Date of Patent: *May 12, 2020

(54) METHOD AND SYSTEM FOR AUTHENTICATING ONLINE TRANSACTIONS

(71) Applicant: Visa International Service Association, San Francisco, CA (US)

(72) Inventors: Lex Bayer, Menlo Park, CA (US); Simon Ru, Brisbane, CA (US); Mark Rose, San Jose, CA (US)

(73) Assignee: Visa International Service Association, San Francisco, CA (US)

(*) Notice: Subject to any disclaimer, the term of this patent is extended or adjusted under 35 U.S.C. 154(b) by 171 days.

This patent is subject to a terminal disclaimer.

(21) Appl. No.: 15/666,911

(22) Filed: Aug. 2, 2017

(65) Prior Publication Data

US 2017/0330175 A1   Nov. 16, 2017

Related U.S. Application Data

(63) Continuation of application No. 14/712,652, filed on May 14, 2015, now Pat. No. 9,754,254, which is a
(Continued)

(51) Int. Cl.
*G06F 21/00* (2013.01)
*G06Q 30/00* (2012.01)
(Continued)

(52) U.S. Cl.
CPC .......... *G06F 21/121* (2013.01); *G06Q 20/12* (2013.01); *G06Q 20/382* (2013.01); *G06Q 20/40* (2013.01);
(Continued)

(58) Field of Classification Search
CPC ................. G06Q 30/018; G06Q 10/0635
See application file for complete search history.

(56) References Cited

U.S. PATENT DOCUMENTS 6,253,027 B1   6/2001 Weber et al.
6,957,199 B1   10/2005 Fisher
(Continued)

OTHER PUBLICATIONS

"Menn, Joseph, 'ID thieves find a niche in online social networks", May 5, 2008, Los Angeles Times, 1-4" (Year: 2008).*
(Continued)

*Primary Examiner* — William J Allen
*Assistant Examiner* — Maria S. P. Heath
(74) *Attorney, Agent, or Firm* — Kilpatrick Townsend & Stockton LLP

(57) ABSTRACT

The present invention generally relates to authenticating online transactions, and more specifically, to method and system for determining a potentially fraudulent online transaction request based on a risk parameter associated with a user in a networking platform such as, a social networking platform. The method comprises receiving an online transaction request from a user. Thereafter, determining the risk parameter of the user based on one or more profile parameters associated with the user or one or more peer users associated with the user in the community. Based on the risk parameter of the user the online transaction request of the user is authenticated.

20 Claims, 10 Drawing Sheets

Related U.S. Application Data continuation of application No. 12/699,890, filed on Feb. 4, 2010, now Pat. No. 9,070,146.

(51) Int. Cl.
*G06F 21/12* (2013.01)
*G06Q 20/12* (2012.01)
*G06Q 20/40* (2012.01)
*G06Q 30/06* (2012.01)
*G06Q 50/00* (2012.01)
*G06Q 20/38* (2012.01)

(52) U.S. Cl.
CPC ..... *G06Q 20/4016* (2013.01); *G06Q 30/0185* (2013.01); *G06Q 30/0601* (2013.01); *G06Q 50/01* (2013.01)

(56) References Cited

U.S. PATENT DOCUMENTS

| | | |
|---|---|---|
| 7,424,457 B2 | 9/2008 | Khaishgi et al. |
| 2002/0010684 A1 | 1/2002 | Moskowitz |
| 2003/0126094 A1 | 7/2003 | Fisher et al. |
| 2004/0064453 A1* | 4/2004 | Ruiz ............... G06F 21/32 |
| 2005/0192958 A1 | 9/2005 | Widjojo et al. |
| 2007/0233615 A1 | 10/2007 | Tumminaro |
| 2008/0103923 A1 | 5/2008 | Rieck et al. |
| 2008/0288405 A1 | 11/2008 | John |
| 2011/0137789 A1 | 6/2011 | Kortina et al. |
| 2012/0310814 A1 | 12/2012 | McNab et al. |

OTHER PUBLICATIONS

International Application No. PCT/US2011/023627, International Search Report and Written Opinion dated Apr. 8, 2011, 8 pages.
Examination Report dated Oct. 28, 2014 issued for Australian Patent Application No. 2011212901, 4 pages.
Notice of Allowance dated Mar. 3, 2015 for U.S. Appl. No. 12/699,890, 5 pages.
Non-Final Office Action dated Dec. 5, 2014 for U.S. Appl. No. 12/699,890, 13 pages.
Final Office Action dated Jun. 25, 2012 for U.S. Appl. No. 12/699,890, 18 pages.
Non-Final Office Action dated Feb. 15, 2012 for U.S. Appl. No. 12/699,890, 19 pages.

* cited by examiner

METHOD AND SYSTEM FOR AUTHENTICATING ONLINE TRANSACTIONS

CROSS-REFERENCES TO RELATED APPLICATIONS

This application is a continuation of U.S. patent application Ser. No. 14/712,652, filed May 14, 2015, which is a continuation of U.S. patent application Ser. No. 12/699,890, filed Feb. 4, 2010, the disclosures of which are hereby incorporated by reference in their entireties for all purposes.

FIELD OF THE INVENTION

The present invention generally relates to authenticating online transactions, and more specifically, to a method and system for determining a potentially fraudulent online transaction request based on profile parameters associated with a user and one or more of user's associations in a networking platform such as, a social networking platform.

BACKGROUND OF THE INVENTION

Generally, a current trend in companies, offering social networking application over the internet, is to create networking platforms that allow third party entities to develop application on those networking platforms. In this manner, the companies offering social networking application over the internet utilize diversity and skills of many third party entities to create applications that benefit users of the networking platform and enhance the value of the social networking application as a whole. These applications, created by the third party entities, are software applications performing a certain task within an environment and structure of the networking platform. The applications include a software utility, a user entertainment application, a game, a communication tool, a monitoring agent and many others. Example of popular and prominent companies offering social networking application over the internet may include, but not limited to, Facebook®, MySpace®, Bebo®, Hi5® and Orkut®. Some examples of popular applications that reside on networking platform offered by Facebook® may include, but not limited to, Scratch and Win® by Backstage Technologies®, Texas Hold'em Poker® by Zynga® and Armies® by FrozenBear®. More often than not, these networking platforms allow these applications to leverage the information hosted by the networking platform. The information includes user data, networking platform data and others.

The monetization methods adopted by the third party entities include subscription fees, advertising, sponsorship, direct payments, payment for offers and many others. For an example, the third party entity may charge a small amount of subscription fee from the users for using their application. In another example, the third party entity may charge the users on a pay-per-use basis i.e. the users pay a fee every time the users uses the applications. In another example, the third party entity may charge the user for virtual goods i.e., digital items that the users can utilize within the third party application. An example of such a digital item may be a type of sword in a gaming application that a user purchases. This sword may bestow additional skills, powers and abilities to the user within the gaming application that are not otherwise available to the users. Another example of digital items may include, but not limited to, a self-expression item, a decorative item such as a clothing for an avatar to wear in a gaming application, a decoration or a property that an avatar may own in the gaming application. Therefore, there exists a need for a system to enable the users to make payment for these applications.

Further, the users accessing these applications may commit fraud and thus the online transaction request may be a fraudulent transaction. For example, fraud may take a form of a credit card chargeback, a reversal of payment through a payment provider or a default of a check or funds. In an example, a user may commit a fraud by accessing and playing a paid game and thereafter requesting a refund pretending a misuse of their credit card by malicious users for purchasing the paid game. In another instance, a user may commit a fraud by deliberately using stolen, illegitimate or hacked data pertaining to credit cards or internet banking with the intent of profiting from the fraud. Therefore, there is a need for a method and system that enables safe online transaction between the companies offering social networking platform, the third party applications and the users.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
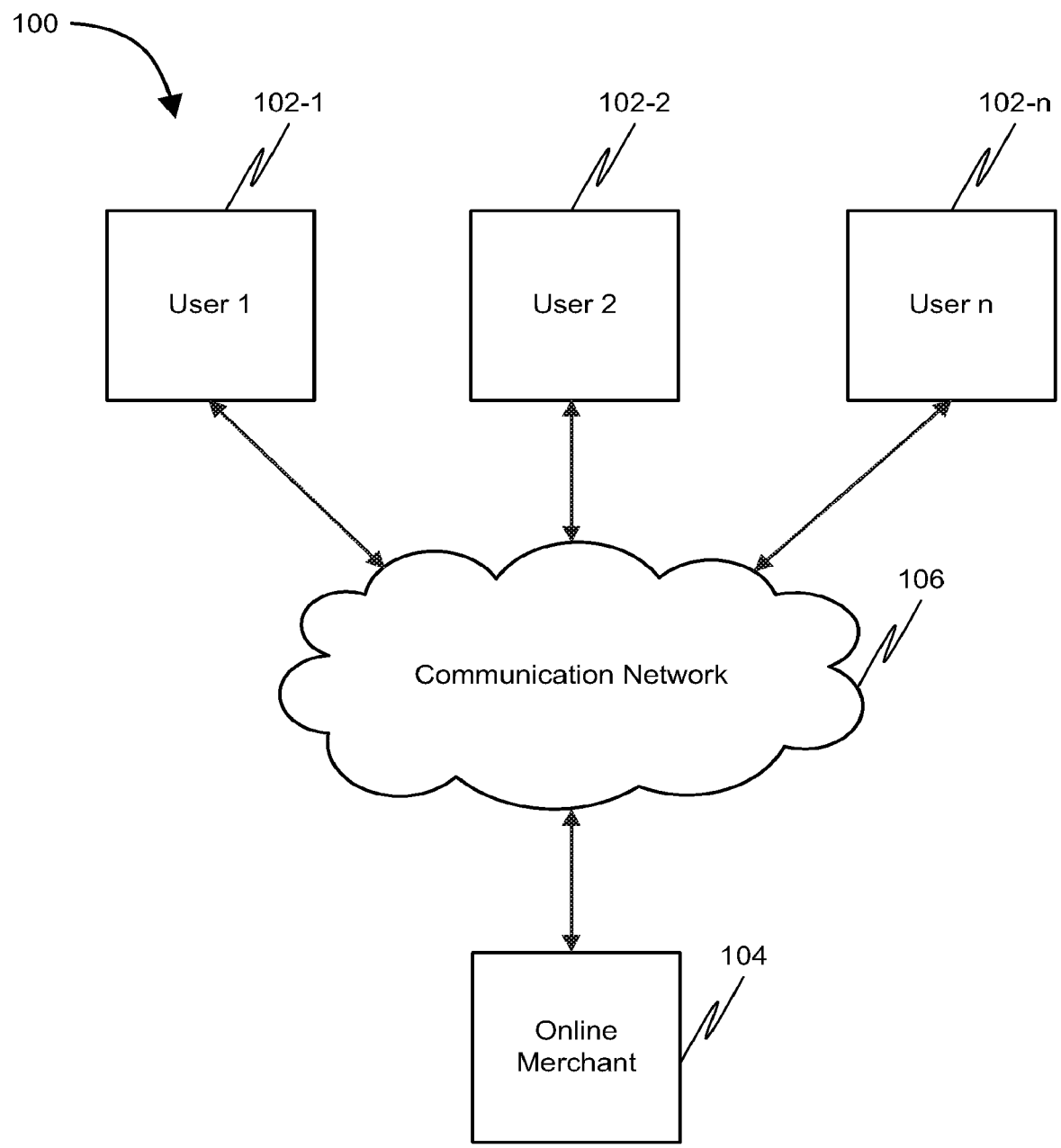
FIG. 1 illustrates a block diagram of a transaction authenticating environment in which various embodiments of the invention may function.

Skilled artisans will appreciate that elements in the figures are illustrated for simplicity and clarity and are symbolic and have not necessarily been drawn to scale. For example, the dimensions or number of some of the elements in the figures may be exaggerated relative to other elements to help to improve understanding of embodiments of the present invention.

DETAILED DESCRIPTION OF THE INVENTION

As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a representative basis for teaching one skilled in the art to variously employ the invention in virtually any appropriately detailed structure. Further, the terms and phrases used herein are not intended to be limiting but rather to provide an understandable description of the present invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Before describing in detail embodiments that are in accordance with the present invention, it should be observed that the embodiments reside primarily in combinations of method steps and apparatus components related to method and system for authenticating online transactions. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the present invention described herein may be comprised of one or more conventional transaction-clients and unique stored program instructions that control the one or more transaction-clients to implement, in conjunction with certain non-transaction-client circuits, some, most, or all of the functions of a method for transaction authenticating system. The non-transaction-client circuits may include, but not limited to, a radio receiver, a radio transmitter, signal drivers, clock circuits, power source circuits, user input devices, computer processors, computers, servers, databases and cloud computing devices. As such, these functions may be interpreted as steps of methods for authenticating online transactions. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the present invention provides transaction authenticating system. The method includes receiving an online transaction request from a user. Thereafter, a risk parameter of the user is determined based on one or more profile parameters associated with one or more of the user and a peer user associated with the user in a community. Subsequently, the online transaction request is authenticated at least in part based on the risk parameter associated with the user.

FIG. 1 illustrates a transaction authenticating environment 100 in which various embodiments of the invention may function. Transaction authenticating environment 100 receives requests for multiple online transactions from users and authenticates these received online transaction requests. An online transaction may include, but not limited to, buying, selling, transferring, returning and refunding of goods, services, and currency. The goods may include, but not limited to a real commodity and a virtual commodity. Further, the currency may include, but not limited to a real currency and a virtual currency. As shown in FIG. 1, users 102-*n* such as user 102-1 and user 102-2 may send an online transaction request to an online merchant 104 over a communication network 106. Online merchant 104 may be a company or an organization that may communicate with users 102-*n* over internet for transacting goods, services and currency. It will be apparent to the person skilled in the art that online merchant 104 may communicate with users 102-*n* using other modes of communication. Online merchant 104 may transact goods, services and currency with either users 102-*n* or other business entities (not shown in FIG. 1) or both. Examples of online merchant 104 may include, but not limited to, eBay Inc®, Amazon.com®, Buy.com® and BarnesandNoble.com®.

Communication network 106 may include for example, but are not limited to, Internet, Wide Area Network (WAN), Local Area Network (LAN), Integrated Services Digital Network (ISDN), Broadband network, Wireless Interoperability Microwave Access (WiMAX) communication network, 3rd Generation Partnership Project (3GPP), Public Switched Telephone Network (PSTN), Universal Mobile Telecommunication Systems (UMTS), Ultra Mobile Broadband (UMB) network, terrestrial digital TV, radio and short-range radio. Users 102-*n* may use one or more computing devices (not shown in the FIG. 1) for sending the transaction request to online merchant 104. Examples of a computing device may include, but not limited to, a cell phone, a laptop, a computer, an e-book, a Personal Digital Assistant (PDA) or any other wireless or wired device capable of connecting to online merchant 104 over the communication network 106.

Upon receiving the online transaction request from users 102-n, online merchant 104 may verify whether the online transaction request is a potentially fraudulent or a genuine online transaction request. Based on this verification process, online merchant 104 may deny or accept the online transaction request received from user 102.

Figure 2:
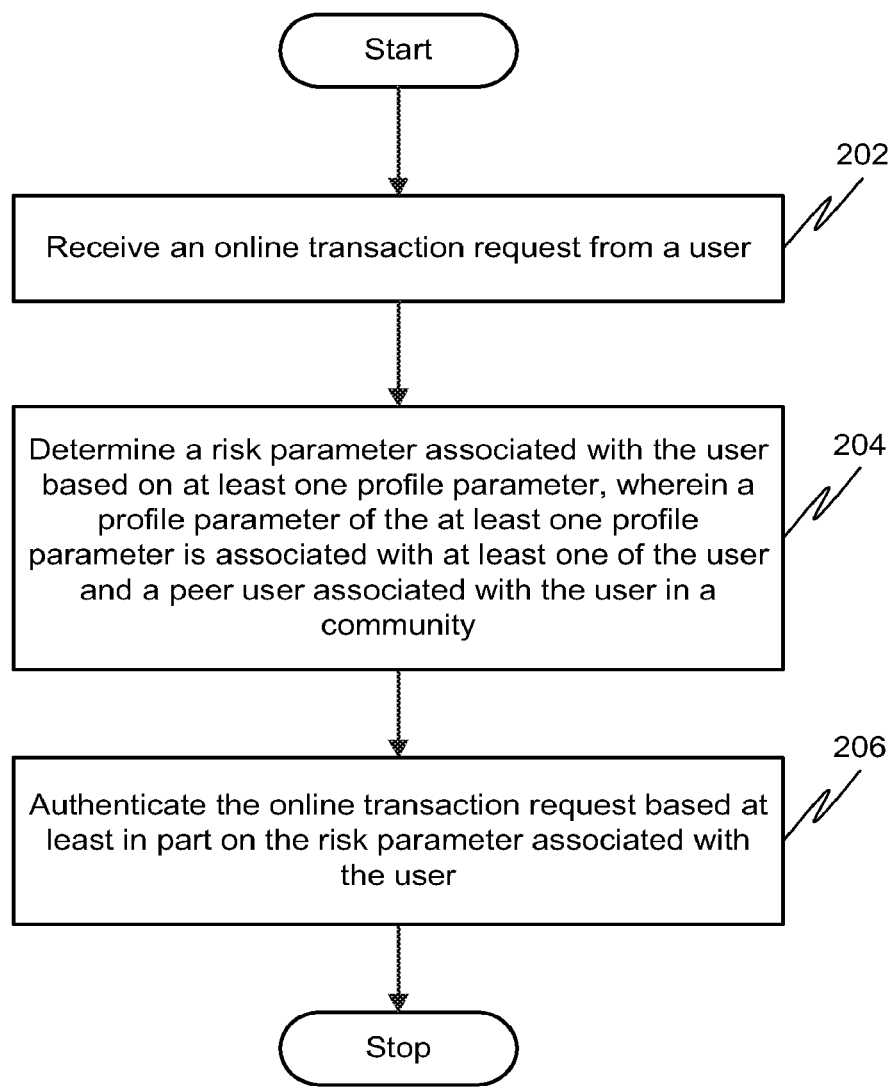
FIG. 2 illustrates a flow diagram of a method for authenticating online transactions in accordance with an embodiment of the invention.

FIG. 2 illustrates a flow diagram of a method for authenticating online transactions in accordance with an embodiment of the invention. An online merchant authenticates an online transaction request from a user based on the one or more profile parameters. The one or more profile parameters may be obtained from one or more networking platforms. A networking platform may be a social networking platform. Examples of the social networking platform may include, but not limited to, Facebook®, MySpace®, Bebo®, Hi5®, Orkut® and so on.

At step 202, an online transaction request is received from a user. For example, online merchant 104 receives a request for one or more transactions from users 102-n. Thereafter, a risk parameter associated with the user is determined based on one or more profile parameters associated with the user at step 204. In an instance, online merchant 104 analyzes a history of transaction data pertaining to all the transaction requests from users 102-n to identify correlations between profile parameters and a likelihood of the users 102-n committing fraud. Thereafter, this correlation may be used for determining risk parameters associated with users 102-n. The profile parameters may be obtained from one or more networking platforms where users 102-n have an account.

A profile parameter of the one or more profile parameters may be associated with the user or a peer user associated with the user in a community such as, a social networking community. The peer user may include, but not limited to, friends, colleagues, and relatives. The profile parameter may include, but not limited to, an activity, age, an association membership, a book, a self declared preference, a comment, a current or former employer, a current or former job position, a city, a club membership, a degree major, a degree minor, an education level, family members, fan pages, a gender, a geographic location, a group membership, a hobby, a hometown, an interest, a job title, a marital status, a music, a movie, an occupation, a number of community connections, a number of friends, a number of recommendations from the community connections, a number of photos, photos, political views, religions views, a page membership, a refund score, a relationship status, a sport and a television show.

The risk parameter may be a numerical value indicating a level of trustworthiness associated with the user. However, it will be apparent to a person skilled in the art that the risk parameter may be indicated in any other form. For example, if a correlation is identified in transaction data that suggests higher education levels are indicative of trustworthy purchases with very low rates of default, users 102-n may have one hundred associations and all the associations are educated with at least a Bachelors degree or above. In this case, a potential risk of fraud associated with users 102-n may be low. Thus, it may be concluded that it is unlikely that users 102-n may not commit any fraud while performing an online transaction with online merchant 104.

In an embodiment of the invention, the risk parameter may be determined by the online merchant. For example, online merchant 104 may determine the risk parameter based on the one or more profile parameters. In this case, online merchant 104 may communicate with a networking platform such as, a social networking platform associated with users 102-n over communication network 106 in order to obtain the one or more profile parameters. Alternatively, a networking platform may determine a risk parameter associated with the user beforehand using the one or more profile parameters associated with the user. In this case, the networking platform may send the risk parameter of the user to the online merchant upon receiving a request from the online merchant.

The networking platform may determine risk parameters of all the users having an account with the networking platform beforehand. The networking platform may store the risk parameters of all the users in a database. The database may be integrated within the networking platform. Alternatively, the database may be external to the networking platform. The networking platform may update the database on a periodic basis. Thereafter, the networking platform may permit the online merchant to access the database. The online merchant may be authenticated by the networking platform before granting access to the database.

While determining the risk parameter associated with the user, the genuineness of a profile of the user may be determined. The genuineness of a user profile indicates whether the user profile is real or fake. Often, users create fake profiles within a networking platform such as, a social networking platform with the intentions to commit fraud. Therefore, the data associated with such user profiles is not legitimate or complete as compared to real or genuine user profiles. These fake profiles often may not have data or may have less data or incomplete data preferences. In addition, these fake profiles may not have friends or may have very less number of friends. In such a scenario, more weight may be assigned to a particular profile parameter as compared to other profile parameters while determining the genuineness of the user profile and the risk parameter. For example, a profile parameter such as 'number of friends' may be assigned more weight as genuine users invest a considerable amount of time in establishing their profiles, real friends and their data preferences. In an instance, a user may have a huge number of friends and most of the friends may have committed fraud at some point of time. In this case, the odds of the user committing fraud may be high. Conversely, if most of the user's friends have a history of legitimate transactions then the odds of the user being trustworthy may be high. Therefore, the user's social network is an indication of the user's peer group and these social networks often behave in similar manners.

In another example, a data related to usage of a social networking platform or any application in the social networking application by the user may be used to determine the genuineness of the profile and the risk parameter associated with the user. The usage data may include, but not limited to, a date of an account creation, frequency of the account access, last login date and time, frequency of access of a gaming application and a level of play inside the gaming application. Thus, if the user frequently accesses his account on a periodic basis then the user is less likely to commit a fraud. Further, a user frequently engaging himself with the gaming application for a longer period is also less likely to commit a fraud.

In an embodiment of the invention, one or more criteria may be employed in determining the risk parameter of the user based on the one or more profile parameters. The one or more criteria may be employed by the networking platform, the online merchant or any other third party evaluators. For example, in a scenario, the one or more criteria, may include but not limited to, sub-dividing a profile parameter at different levels, assigning weight to each sub-divided level of the profile parameter, comparing a profile parameter of a user with the sub-divided level of the profile parameter, assigning a weight to a profile parameter of the user based on comparison, collating the weights of the profile parameters, and averaging the weight of all the profile parameters.

For example, a profile parameter such as, education may be sub-divided at the following levels: a Post-Doctoral degree, a Master's degree, a Bachelor's degree, an Undergraduate degree and below Undergraduate degree. Thereafter, a weight may be assigned to individual sub-divided level of the profile parameter education. The weight may be assigned on a scale of 1 to 10. For example, a Post-Doctoral degree may be assigned a weight of 10, while a Doctoral degree may be assigned a weight of 9. Similarly, a Master's degree may be assigned a weight of 7, a Bachelor's degree may be assigned a weight of 6, a Undergraduate degree may be assigned a weight of 5 and below Undergraduate may be assigned a weight of 0.

In another example, a profile parameter such as, marital status may be sub-divided at the following levels: married, single (i.e. never married), separated, divorced, unknown (i.e. user may have declined to reveal the marital status). Thereafter, a weight may be assigned to individual sub-divided level of the profile parameter the marital status. The weight may be assigned on a scale of 1 to 10. For example, married may be assigned a weight of 10, while a single (i.e. never married) may be assigned a weight of 8. Similarly, a separated user may be assigned a weight of 6, a divorced may be assigned a weight of 4 and an unknown (i.e. user may have declined to reveal the marital status) may be assigned a weight of 0.

In another instance, a profile parameter such as a geographic location may be sub-divided at the following levels: a geographic location 1, a geographic location 2, a geographic location 3 and a geographic location 4. The geographic location 1 may have reported zero crime rates, the geographic location 2 may have lower crime rates, the geographic location 3 may have moderate crime rates whereas the geographic location 4 may have higher crime rates. Thereafter, a weight may be assigned to these geographic locations. The weight may be assigned on a scale of 1 to 10. For example, the geographic location 1 may be assigned a weight of 10, while the geographic location 2 may be assigned a weight of 8. Similarly, the geographic location 3 may be assigned a weight of 4 whereas the geographic location 4 may be assigned a weight of 0. It will also be apparent to person skilled in the art that the one or more profile parameters may be assigned weights in any other manner other than as described in the above examples.

The process of determining the risk parameter of the user based on the profile parameters using the one or more criteria is now explained by way of an example. For example, user 102-1 is educated with a Doctoral degree, is married and resides in a geographic location that falls under the category of the geographic location 1. Whereas, user 102-2 is educated below undergraduate degree, is divorced and resides in a geographic location that falls under the category of the geographic location 4. The profile parameters of user 102-1 and user 102-2 are compared with the sub-divided levels of the profile parameters. Thereafter, based on comparison the profile parameters of user 102-1 and 102-2 are assigned weights. In this scenario, the cumulative weight of the profile parameters of user 102-1 is 29 whereas for user 102-1 is 4. It may be determined that the risk parameter of user 102-1 is lower whereas for user 102-2 is higher. Therefore, it may be determined that user 102-2 is more likely to commit fraud while performing online transactions.

In another scenario a profile parameter, such as a refund score, may be used to determine the risk parameter of the user. The refund score may be determined based on a refund statistics of the user. The refund statistics is associated with refunding of one of the real goods, the virtual goods, the service and the currency to the online merchant. For example, a refund statistics indicate the value of currency purchased against the value of currency returned to the online merchant. Alternatively, the refund statistics may indicate a probability of the user returning goods obtained from the online merchant if the user does not require the goods. A lower refund score may denote that user is trustworthy.

For example, user 102-1 may request a purchase of a virtual currency in exchange for a real currency worth $10 where as user 102-2 may request a purchase of a virtual currency in exchange for a real currency worth $50. However, user 102-1 may have a history of refunding 90% of the virtual currency purchased from online merchant whereas in the past user 102-2 may have never requested a refund from the online merchant. In such a scenario, it may be determined that user 102-1 have a high refund score whereas the user 102-2 have a zero refund score. In this scenario, the risk parameter of the user 102-1 is high whereas for user 102-2 it is low. Therefore, it is deemed that user 102-1 is less trustworthy based on the risk parameter of user 102-1.

Once the risk parameter of the user is determined, the online transaction request of the user is authenticated based at least in part of the risk parameter at step 206. The user is then partially or fully allowed or denied the transaction with the online merchant based on this authentication process. Alternatively, the user may be allowed a particular level of transaction with the online merchant based on the risk parameter associated with the user. This is explained in detail in conjunction with FIG. 3.

Figure 3:
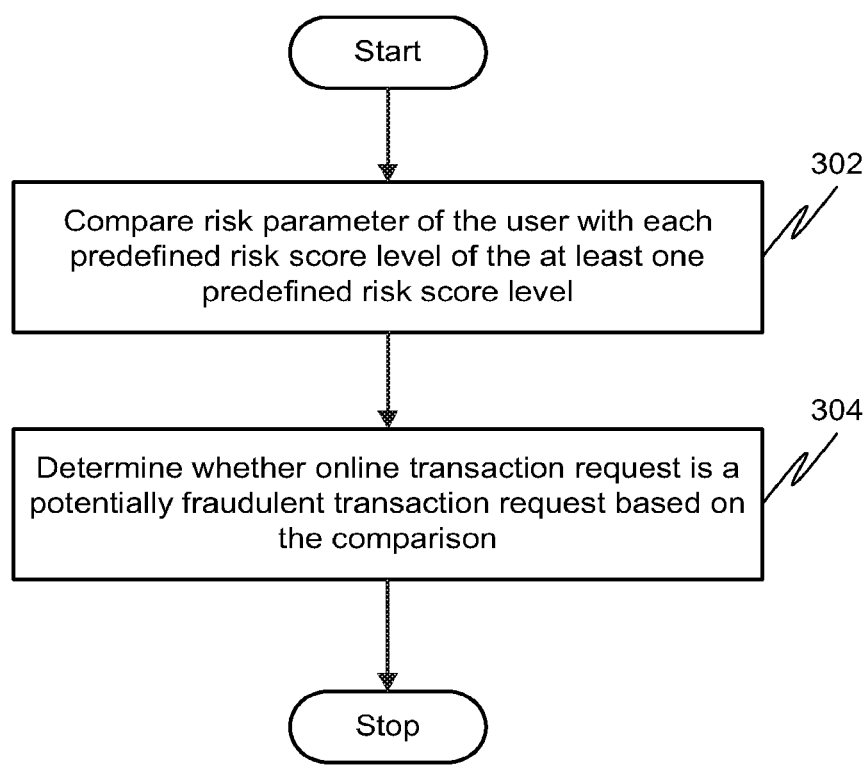
FIG. 3 illustrates a flow diagram of a method for determining a potentially fraudulent online transaction request in accordance with an embodiment of the invention.

FIG. 3 is a flow diagram of a method for determining a potentially fraudulent online transaction request in accordance with an embodiment of the invention. The one or more profile parameters associated with user or peer users associated with the user may be used for determining a risk parameter of the user. The risk parameter may be associated with multiple risk levels. Thus, an online transaction request from the user is authenticated based on a risk level of the risk parameter associated with the user.

As depicted in FIG. 3, once the risk parameter of the user is obtained, the risk parameter is compared with one or more predefined risk score levels at step 302. A predefined risk score level indicates a level of risk associated with the user. In an embodiment of the invention, the online merchant compares the risk parameter of the user with the one or more predefined risk score levels. In a scenario, the one or more predefined risk score levels may be defined by the online merchant. During the comparison process, the online merchant identifies that the risk parameter falls within a predefined risk score level of the one or more predefined risk score levels.

Alternatively, the one or more predefined risk score levels may be defined by the networking platform. In this case, the networking platform may identify whether the risk parameter fall within a predefined score level of the one or more predefined risk score levels. Thereafter, the networking platform communicates the predefined risk score level associated with the risk parameter to the online merchant.

Each predefined risk score level of the one or more predefined risk score levels may have restrictions and privileges associated with that level. These restrictions and privileges not only indicate certain transaction constraints but also indicate the level of transaction authorization trustworthiness between the user and online merchant. The restrictions and privileges associated with a predefined risk score level may be defined by the online merchant. Alternatively, the restrictions and privileges associated with the predefined risk score level may be defined by the networking platform such as, a social networking platform.

For example, one or more risk score levels include risk score level-1, risk score level-2 and risk score level-3. For the risk score level-1, online merchant 104 may not entertain any online transaction request from user **102-*n*. Whereas, for the risk score level-2, online merchant 104 may limit the maximum amount of currency that can be transacted by users 102-*n* to online merchant 104 as $10. Further, for the risk score level-3, online merchant 104 may specify the maximum amount of currency that can be transacted by users 102-*n* to online merchant 104** should not exceed $100.

Based on the predefined risk score level of the risk parameter, at step 304, the online merchant determines whether the online transaction request is a potentially fraudulent online transaction request. Thereafter, the online merchant may allow or deny the user from transacting with the online merchant.

For example, users **102-*n* having an account with one or more networking platforms, requests for an online transaction with online merchant 104. It may so happen that the user may have a risk parameter of 15. Online merchant 104 compares the risk parameter of users 102-*n* with five predefined risk score levels. Thus, the five predefined risk score levels include a level-1, a level-2, a level-3, a level-4 and a level-5. The predefined risk score levels such as, level-1, level-2, level-3, level-4 and level-5 correspond to risk parameter value ranges such as, 1-20, 21-40, 41-60, 61-80 and 81-100, respectively. Online merchant 104 determines that users 102-*n* falls under the category of risk score level-1. Thereafter, online merchant 104 checks restrictions and privileges associated with the risk score level-1 and subsequently denies the online transaction request of the users 102-*n*. In this manner, the online merchant 104 is able to determine the potentially fraudulent users 102-*n*** beforehand thereby averting the potential business risk associated with transaction.

Figure 4:
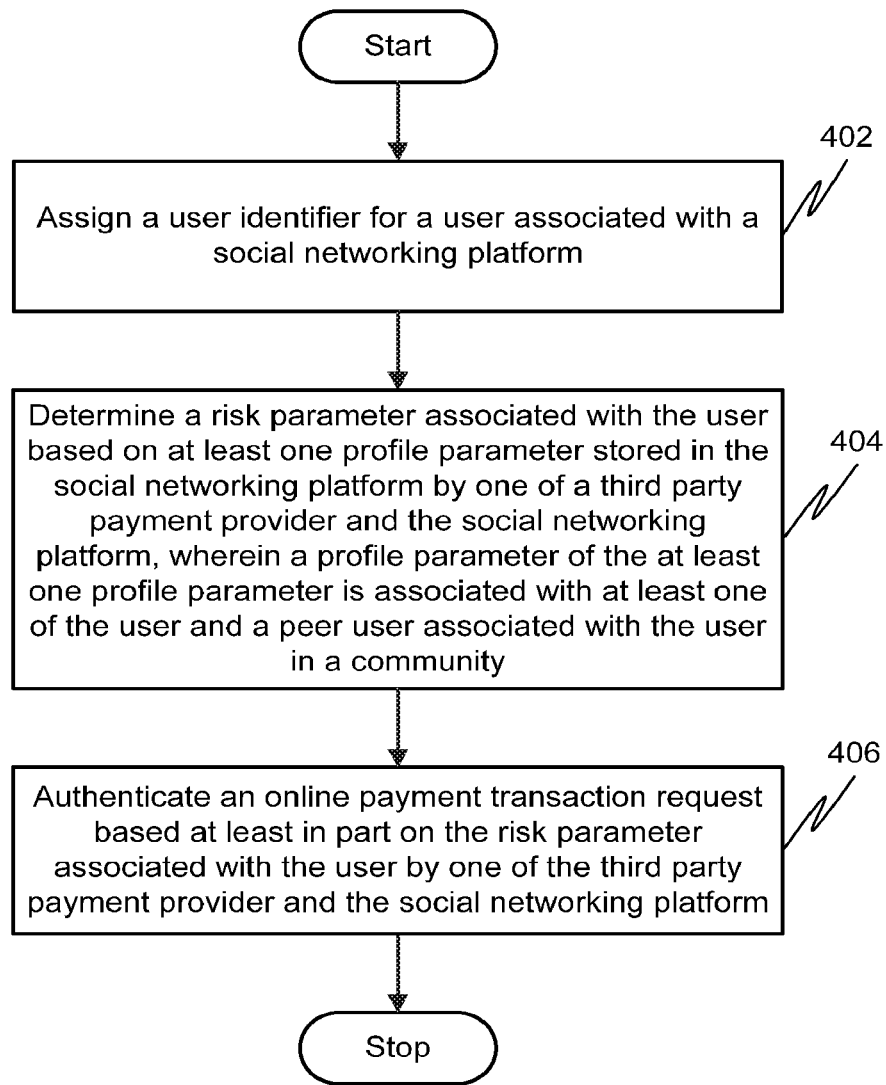
FIG. 4 illustrates a flow diagram of a method for authenticating an online payment transaction request in accordance with another embodiment of the invention.

FIG. 4 illustrates a flow diagram of a method for authenticating online payment transaction requests in accordance with another embodiment of the invention. A user requesting an online payment transaction request may have an account with a networking platform. The online payment transaction request may be then authenticated based on a profile parameters associated with the user present in the networking platform. At step 402, networking platform assigns a user identifier to a user. The user identifier is a unique identifier assigned to each user having an account with the networking platform.

The user may send an online payment transaction request to a third party payment provider. The online payment transaction request may include, but not limited to, buying, selling, transferring, returning and refunding of a currency. The currency may be one of a real currency and a virtual currency. In a scenario, the third party payment provider may enable the user to exchange a virtual currency for a real currency. For this, the user may access a third party payment gateway for transferring the real currency to the third party payment provider. Examples of the third party payment gateway, may include, but not limited to, VISA®, Master® or Maestro®. Thereafter, the third party payment provider may provide an amount of virtual currency equivalent to an amount of real currency received through the third party payment gateway to the user.

In an embodiment of the invention, in addition to having an account with the networking platform, the user may have an account with the third party payment provider. The third party payment provider may enable the user to access the account. The user may access the account to access the account details. The account details may include, but not limited to, balance information and log information. Examples of the log information may include, but not limited to, a transaction log and a login log.

In this embodiment, when the user exchanges a virtual currency for a real currency with the third party payment provider, an amount of virtual currency equivalent to an amount of real currency received through the third party payment gateway is deposited into the account of the user.

Upon receiving the online transaction request from user the third party payment provider may determine a risk parameter associated with user at step 404. The risk parameter of user may be determined based on one or more profile parameters associated with the user. The third party payment provider may obtain the one or more profile parameters from the networking platform. The one or more profile parameters may be associated with the user or one or more associations of the user in the networking platform. The process of determining the risk parameter from the one or more profile parameters is explained in detail in conjunction with FIG. 2.

In a scenario, the third party payment provider may use a profile parameter associated such as a refund score of the user to determine the risk parameter of the user. The third party payment provider may employ the process of determining the risk parameter from refund score explained in detail in conjunction with FIG. 2. Thereafter, at step 406, the third party payment provider may authenticate the online payment transaction request of the user based at least in part on the risk parameter associated with user.

Figure 5:
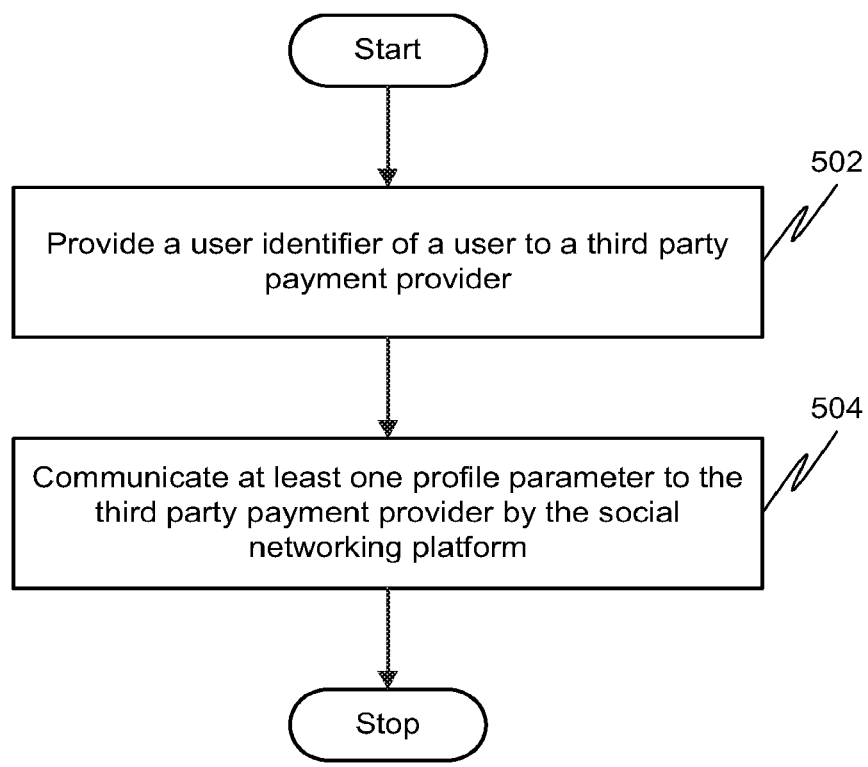
FIG. 5 illustrates a flow diagram of a method for communicating at least one profile parameter and a user identifier to the third party payment provider.

FIG. 5 illustrates a flow diagram of a method for communicating at least one profile parameter and a user identifier to the third party payment provider. At step 502, the networking platform provides the user identifier of the user to the third party payment provider. In an embodiment of the invention, the third party payment provider may be integrated within a platform of the networking platform. The platform may include, but not limited to, a software platform, a hardware platform or a combination of the software platform and the hardware platform. In this case, the third party payment provider may use the unique identifier provided to each user for identifying the user. The user identifier is explained in detail in conjunction with FIG. 4.

Thereafter, the networking platform communicates the one or more profile parameters associated with the user to the third party payment provider at step 504. The one or more profile parameters may be transferred by the networking platform upon receiving a request from the third party payment provider. The third party payment provider may send such a request upon receiving the online payment transaction request from the user.

Figure 6:
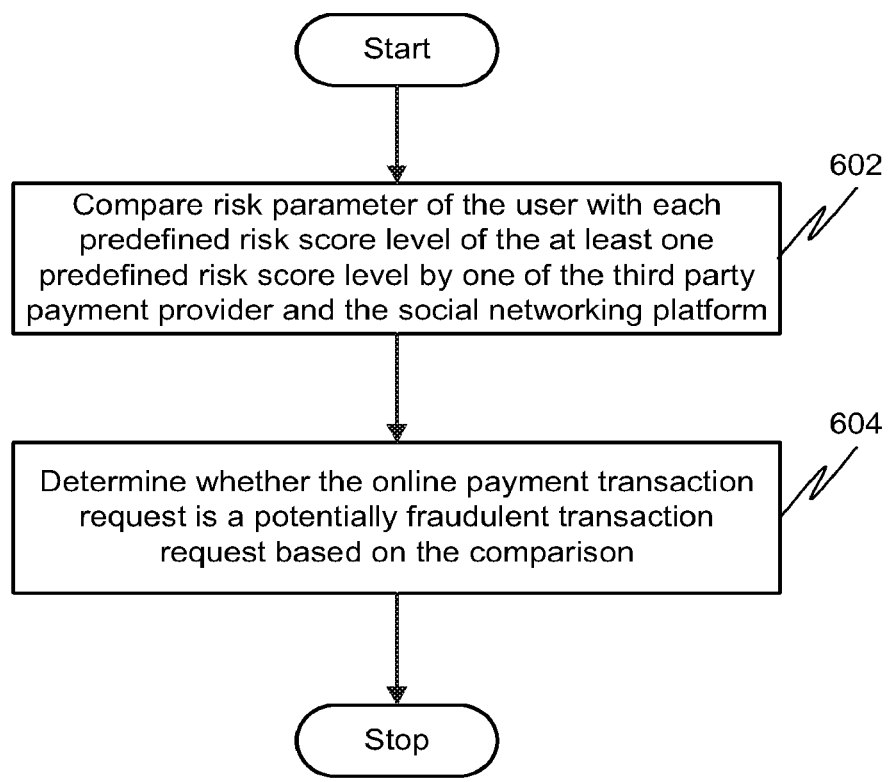
FIG. 6 illustrates a flow diagram of a method for determining a potentially fraudulent online payment transaction request by the third party payment provider in accordance with another embodiment of the invention.

FIG. 6 illustrates a flow diagram of a method for determining a potentially fraudulent online payment transaction request by the third party payment provider in accordance with another embodiment of the invention. The risk parameter associated with one or more users determined based on the one or more profile parameters may be associated with multiple risk levels. Thus, an online payment transaction request from the user is authenticated based on a risk score level of the risk parameter. Once the risk parameter associated with the user is determined, the third party payment provider may compare the risk parameter of the user with predefined risk score levels at step 602. In an embodiment of the invention, the one or more predefined risk score levels may be defined by the third party payment provider. During the comparison process, the third party payment provider identifies that the risk parameter falls within a predefined risk score level of the one or more predefined risk score levels. The process of comparing the risk parameter with the one or more predefined risk score levels is explained in detail in conjunction with FIG. 3. Also, each predefined risk score level of the one or more predefined risk score levels may have restrictions and privileges associated with that level. These restrictions and privileges not only indicate certain transaction constraints buy also indicate the level of transaction authorization trustworthiness between the user and third party payment provider. The restrictions and privileges associated with a predefined risk score level may be defined by the third party payment provider. The restriction and privileges associated with risk score levels is explained in detail in conjunction with FIG. 3.

Based on the predefined risk score level of the risk parameter, at step 604, the third party payment provider determines whether the online payment transaction request is a potentially fraudulent online payment transaction request. Thereafter, the third party payment provider may allow or deny the user from transacting with the third party payment provider.

Figure 7:
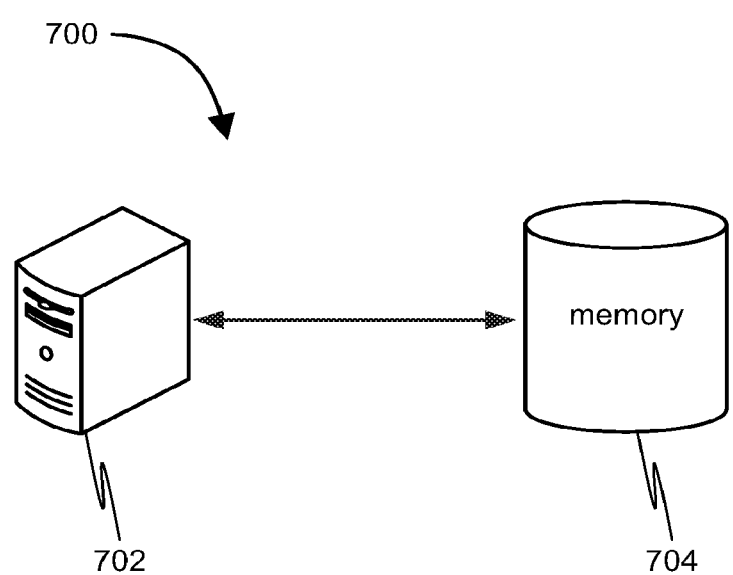
FIG. 7 illustrates a block diagram of a system for authenticating online transaction requests in accordance with an embodiment of the invention.

Turning now to FIG. 7, which illustrates a system for authenticating online transaction requests in accordance with an embodiment of the invention. As shown in FIG. 7, system 700 includes a processor 702 and a memory 704. Processor 702 interacts with memory 704 for authenticating one or more online transaction requests from a user. In an embodiment of the invention, the user may request an online transaction with the online merchant. The user may have an account with networking platform. In the networking platform, the user may have one or more peer users associated with the user. The user and the one or more peer users may have one or more profiles associated with their account with the networking platform. The profiles may have one or more profile parameters associated with the profiles. These profile parameters may be stored in memory 704.

Processor 702 receives the online transaction request from the user. The online transaction request is explained in detail in conjunction with FIG. 2. Upon receiving the online transaction request, processor 702 communicates with memory 704 for accessing the one or more profile parameters stored therein. In a scenario, processor 702 communicates with the networking platform for accessing the one or more profile parameters. In this case, memory 704 may be integrated within the networking platform. Once processor 702 obtains the one or more profile parameters, processor 702 processes the one or more profile parameters in order to determine the risk parameter of the user. The process of determining the risk parameter of the user is described in detail in conjunction with FIG. 2. The risk parameter indicates a level of trustworthiness associated with the user.

In an embodiment of the invention, processor 702 may determine a refund score based on a refund statistics associated with one the user and a peer user associated with the user in the community. The refund statistics is associated with refunding of the goods, services and currency to the online merchant by the user or other users associated with the user. Thus, the user and each user associated with the user may have a corresponding refund score. The refund score may be a profile parameter of the one or more profile parameters stored in memory 704. In an embodiment of the invention, the refund score may be stored as a profile parameter in the networking platform. Thereafter, processor 702 may determine the risk parameter of the user based on the refund score. The process of determining the risk parameter based on the refund score is explained in detail in conjunction with FIG. 2.

Processor 702 compares the risk parameter of the user with one or more predefined risk score levels. The processes of comparing the risk parameter with one or more predefined risk score levels is explained in detail in conjunction with FIG. 3. The user is then categorized based on the risk score level of the risk parameter. In an embodiment of the invention, the data associated with the predefined risk score levels may be stored in memory 704. Upon comparison, processor 702 determines whether the online transaction request from the user is a potentially fraudulent request based on the risk parameter of the user. Thereafter, processor 702 authenticates the online transaction request from the user.

After authenticating the online transaction request from the user, processor 702 authorizes the online transaction request. The authorization of the online transaction request is performed based on a set of transaction constraints associated with the authenticated online transaction request. The set of transaction constraints may include, but not limited to, restrictions and privileges associated with the risk score level described earlier in the disclosure. These set of transaction constraints indicate a level of trustworthiness of transaction authorized to user. Based on risk score level category of the user, and subsequent restrictions and privileges associated with that risk score level, processor 702 authorizes the online transaction request. This is explained in detail in conjunction with FIG. 3.

Figure 8:
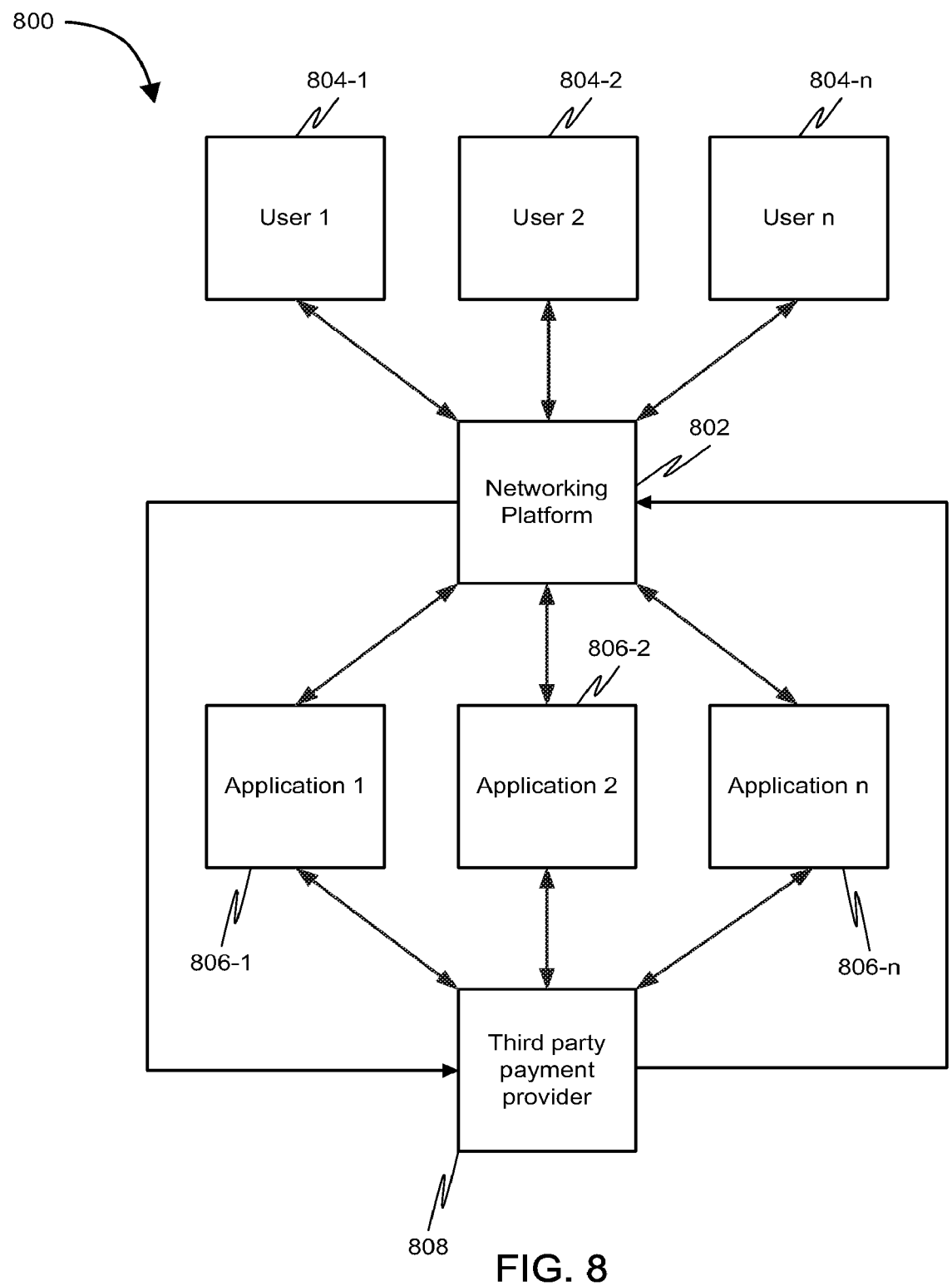
FIG. 8 illustrates a block diagram showing authentication of an online transaction request, in accordance with an exemplary embodiment of the invention.

Turning now to FIG. 8, a block diagram showing authentication of an online transaction request, in accordance with an exemplary embodiment of the invention. Environment 800 includes a networking platform 802 and users 804-*n*. Users 804-*n* such as, a user 804-1 and a user 804-*n* may use one or more computing devices (not shown in FIG. 8) for connecting to networking platform 802 over a communication network (not shown in FIG. 8).

One or more computing devices enable users 804-*n* to connect to networking platform 802 through the communication network. The computing device communicates with the communication network through various technologies such as Universal Serial Bus (USB) Port, Global System for Mobile communication (GSM), Code Division Multiple Access (CDMA), Time Division Multiple Access (TDMA), Frequency Division Multiple Access (FDMA), Wide Area Network (WAN), Local Area Network (LAN), Wireless Interoperability Microwave Access (WiMAX), Universal Mobile Telecommunication Systems (UMTS), or General Packet Radio Service (GPRS).

Networking platform 802 enables interactive or non-interactive communication with users 804-*n*. Networking platform 802 interfaces with the communication network for communicating with users 804-*n*. Networking platform 802 interfaces with communication network by using one or more communication protocols. Examples of the one or more communication protocols include, but are not limited to, network protocols such as Internet protocol (IP), transport protocols such as transmission control protocol (TCP), and user datagram protocol (UDP), and application protocols such as session initiation protocol (SIP), H.323, real-time transport protocol (RTP), and real time streaming protocol (RTSP).

Environment 800 further includes one or more applications **806-*n* such as, an application 806-1 and an application 806-2. One or more applications 806-*n* may be developed by third party entities. Third party entities may include, but not limited to, a company and an organization. Networking platform 802 may allow one or more applications 806-*n* developed by the third party entities to be deployed on networking platform 802. Networking platform 802 may be for example, but not limited to, a software platform, a hardware platform or a combination of the software platform and the hardware platform. One or more applications 806-*n*** are software applications and may include, but not limited to, a virtual good, a digital item, an entertainment, a game or a media.

Environment 800 further includes a third party payment provider 808. Third party payment provider 808 may include, but not limited to, a company and an organization. Third party payment provider 808 may be integrated with networking platform 802. Third party payment provider 808 facilitates a transaction between networking platform 802, users **804-*n*** and third party entities.

During operation, networking platform 802 may allow users **804-*n* to access one or more applications 806-*n*. For instance, user 804-1 may be allowed to access a software application i.e. a digital item that user 804-1 may utilize. An example of such a digital item may be a type of sword in a gaming software application that user 804-1 purchases. The sword confers user 804-1** with additional skills, powers and abilities inside of the gaming software application that are not otherwise available to other users. Further examples of digital items may include, but not limited to, a self-expression items, a decorative items such as clothing for an avatar to wear in the gaming software application, a decorations or a property that an avatar may own in the gaming software application.

Subsequently, the third party entities may charge users **804-*n* a fee towards services offered to users 804-*n*. The third party entities may have the sole discretion to charge the fee for the services offered to users 804-*n*. In a scenario, the third party entities may charge a onetime subscription fee from users 804-*n* for accessing one or more applications 806-*n* hosted on networking platform 802. Alternatively, the third party entities may charge users 804-*n* on a pay-per-use basis, i.e. users 804-*n* needs to pay a fee every time users 804-*n* accesses one or more applications 806-*n*. Thus, to access one or more applications 806-*n* hosted on networking platform 802, users 804-*n*** may send an online transaction request to the third party entities.

In order to facilitate the online transaction between users **804-*n* and the third party entities, networking platform 802 may allow third party payment provider 808 to integrate within networking platform 802. More specifically, users 804-*n* may send the online transaction request such as a payment request to the third party entities for accessing one or more applications 806-*n* through third party payment provider 808. Users 804-*n* may pay the third party entities by transferring a desired amount of currency to the third party entities. The currency may be one or more of a virtual currency, a real currency or a combination of both. Third party payment provider 808 authenticates the online transaction request and thereafter allows or denies the online transaction request of user 806-*n*. The process of authenticating the online transaction request is explained in detail in conjunction with FIGS. 4, 5, and 6**.

For example, user 804-1 may access application 806-1 developed by a third party entity, by paying the required fee. The required fee may be paid by user 804-1 in the form of a virtual currency or a real currency. In this case, user 804-1 may request third party payment provider 808 to transfer a required amount of virtual currency to third party entity for accessing application 806-1. Whereas, to make a payment using the real currency, user 804-1 may transfer the required amount of real currency to the third party entity through a third party payment gateway.

Figure 9:
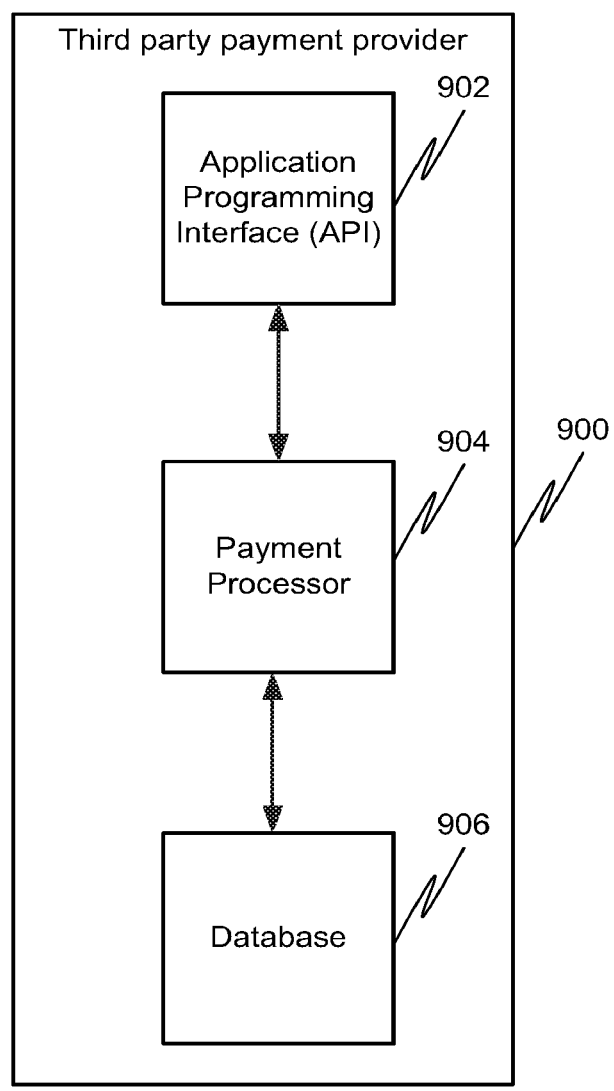
FIG. 9 illustrates a block diagram of a third party payment provider in accordance with an embodiment of the invention.

FIG. 9 illustrates a block diagram of third party payment provider 808 in accordance with an embodiment of the invention. Networking platform 802 may allow third party payment provider 808 to be integrated within networking platform 802. As depicted in FIG. 9, third party payment provider includes an Application Programming Interface (API) 902, a payment processor 904 and a database 906.

In an embodiment of the invention, networking platform 802, users **804-*n* and the third party entities may have an account with third party payment provider 808. Account details of these accounts may be stored in database 906. Networking platform 802, users 804-*n* and the third party entities may access their accounts in third party payment provider 808 using API 902. Users 804-*n* may send online transaction request to access one or more applications 806-*n* developed by the third party entities. Users 804-*n* may connect to third party payment provider 808 using API 902 to send such an online transaction request. In response to receiving the online transaction request, the third party entities may request fee from users 804-*n*. Thereafter, users 804-*n* may request third party payment provider 808 to transfer a certain amount of currency corresponding to the required fee to the third party entities. Payment processor 904 receives the request from the user. Thereafter, payment processor 904 checks database 906 to gather details associated with accounts of users 804-*n*. These details may include, but not limited to, name, balance, transaction log, login history and risk parameters. Payment processor 904 then processes or declines the currency transfer request of users 804-*n* based on one or more details of the accounts of users 804-*n* such as a risk score level associated with users 804-*n***.

Figure 10:
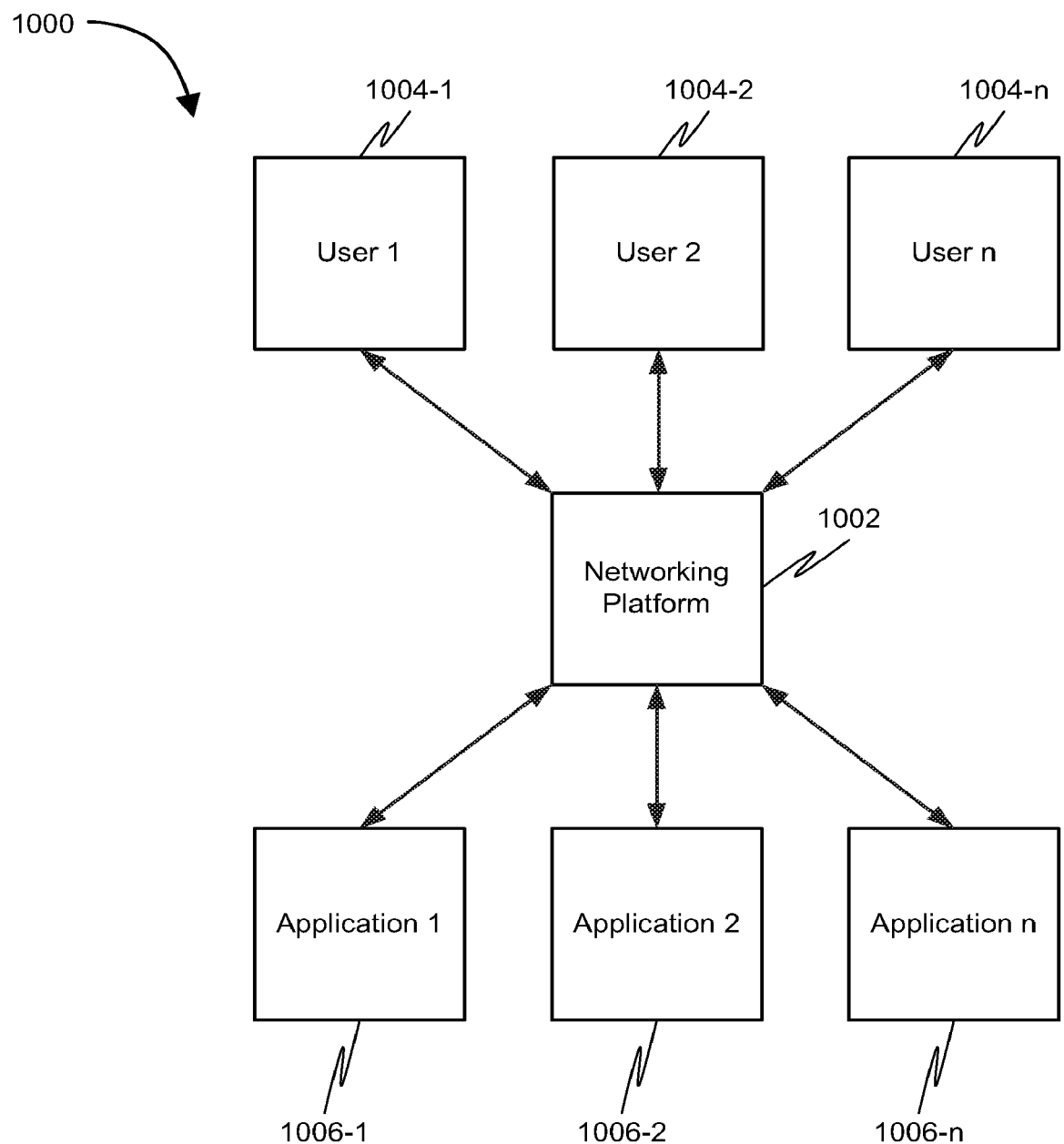
FIG. 10 illustrates a block diagram showing authentication of an online transaction request, in accordance with another exemplary embodiment of the invention.

FIG. 10 illustrates a block diagram showing authentication of an online transaction request, in accordance with another exemplary embodiment of the invention. Environment 1000 includes a networking platform 1002 and users **1004-*n*. Environment 1000 further includes applications 1006-*n* such as, an application 1006-1 and an application 1006-2. Applications 1006-*n* may be developed by one or more third party entities. Networking platform 1002 such as, a social networking platform may allow the third party entities to deploy applications 1006-*n* on networking platform 1002. Networking platform 1002 may further allow users 1004-*n* to access applications 1006-*n*. The third party entities associated with applications 1006-*n* may charge users 1004-*n* a fee towards services offered to users 1004-*n*. Thus, to access applications 1006-*n* hosted on networking platform 1002, users 1004-*n*** may send an online transaction request to the third party entities.

Networking platform 1002 facilitates the online transaction between users **1004-*n* and the third party entities. More specifically, users 1004-*n* may send the online transaction request such as, a payment request to the third party entities for accessing applications 1006-*n* through networking platform 1002. Users 1004-*n* may pay the third party entities by transferring a desired amount of currency to the third party entities. The currency may be one or more of a virtual currency, a real currency or a combination of both. Networking platform 1002 authenticates the online transaction request and thereafter allows or denies the online transaction request of users 1004-*n*. The process of authenticating the online transaction request is explained in detail in conjunction with FIGS. 4, 5, and 6**.

For example, user 1004-1 may access application 1006-1 developed by a third party entity, by paying the required fee. The required fee may be paid by user 1004-1 in the form of a virtual currency or a real currency. In this case, user 1004-1 may request networking platform 1002 to transfer a required amount of virtual currency to the third party entity for accessing application 1006-1. Whereas to make a payment using the real currency, user 1004-1 may transfer the required amount of real currency to the third party entity through a third party payment gateway. Examples of the third party payment gateway, may include, but not limited to, VISA®, Master® or Maestro®.

Various embodiments of the present invention provide method and systems for authentication online transactions. More specifically, the present invention provide method and systems for determining a potentially fraudulent online transaction request based on risk parameters associated with a user in a networking platform. The method and system as disclosed herein uses one or more profile parameters associated with a user or one or more peers users associated with the user in the networking platform in determining the risk parameter.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method comprising:
   receiving, by a processor of a computer system, a request from a user to access an application hosted on a network;
   accessing, by the processor of the computer system, a plurality of profile parameters associated with one or more online profiles associated with the user from a networking platform, each profile parameter having a plurality of subdivided levels;
   comparing, by the processor of the computer system, each profile parameter of the plurality of profile parameters with their respective subdivided levels to obtain assigned weights corresponding to each profile parameter;
   determining, by the processor of the computer system, a risk parameter indicating a level of trustworthiness of the user and whether the one or more online profiles associated with the user is real or fake based on at least the assigned weights of the profile parameters by collating the assigned weights of the profile parameters, or averaging the assigned weights of the profile parameters;
   authenticating, by the processor of the computer system, the user based at least in part on the risk parameter associated with the user, and
   initiating, by the processor of the computer system, execution of the application for access by the user in response to authenticating the user.

2. The method of claim 1, wherein at least one of the plurality of profile parameters is an activity, age, an association membership, a book, a self-declared preference, a comment, a current or former employer, a current or former job position, a city, a club membership, a degree major, a degree minor, an education level, family members, fan pages, a gender, a geographic location, a group membership, a hobby, a hometown, an interest, a job title, a marital status, a music, a movie, an occupation, a number or community connections, a number of friends, a number of recommendations from the community connections, a number of photos, photos, political views, religions views, a page membership, a refund score, a relationship status, a sport or a television show.

3. The method of claim 1, wherein at least one of the profile parameters is:
   a number of peer users in an online community who are associated with the user in the online community as friends, or
   usage data of the user in the online community, the usage data including at least one of a date of creation of an online community account of the user, frequency of access to the online community account of the user, last login data and time of the online community account of the user; frequency of access of a gaming application in the online community using the online community account of the user, or a level of play of the user inside the gaming application.

4. The method of claim 1, wherein at least one of the plurality of profile parameters is a peer user profile parameter of a peer user who is associated with the user in an online community.

5. The method of claim 4, wherein the peer user is associated with the user in the online community as a friend of the user in the online community, a colleague of the user in the online community, or a relative of the user in the online community.

6. The method of claim 1, wherein the networking platform comprises a social networking platform.

7. The method of claim 1, further comprising allowing the user to perform an online transaction associated with at least one of buying, selling, transferring, returning or refunding of at least one of real goods, virtual goods, a service, a real currency, or a virtual currency.

8. The method of claim 1, further comprising determining a refund score based on refund statistics associated with the user or a peer user associated with the user in an online community, wherein the refund statistics is associated with refunding of at least one of a real good, a virtual good, a service, a real currency, or a virtual currency to an online merchant.

9. The method of claim 1, wherein the risk parameter of the user corresponds to a predefined risk score level of at least one predefined risk score level defined by one of an online merchant or the networking platform.

10. The method of claim 1, wherein the application is one of a social networking application or a gaming application.

11. A system comprising:
a memory for storing data associated with a plurality of profile parameters associated with a user;
a processor coupled to the memory, wherein the processor is configured to:
receive a request from a user to access an application hosted on a network;
access a plurality of profile parameters associated with one or more online profiles associated with the user from a networking platform, each profile parameter having a plurality of subdivided levels;
compare each profile parameter of the plurality of profile parameters with their respective subdivided levels to obtain assigned weights corresponding to each profile parameter;
determine a risk parameter indicating a level of trustworthiness of the user and whether the one or more online profiles associated with the user is real or fake based on at least the assigned weights of the profile parameters by collating the assigned weights of the profile parameters, or averaging the assigned weights of the profile parameters;
authenticate the user based at least in part on the risk parameter associated with the user, and
initiating execution of the application for access by the user in response to authenticating the user.

12. The system of claim 11, wherein at least one of the plurality of profile parameters is an activity, age, an association membership, a book, a self-declared preference, a comment, a current or former employer, a current or former job position, a city, a club membership, a degree major, a degree minor, an education level, family members, fan pages, a gender, a geographic location, a group membership, a hobby, a hometown, an interest, a job title, a marital status, a music, a movie, an occupation, a number or community connections, a number of friends, a number of recommendations from the community connections, a number of photos, photos, political views, religions views, a page membership, a refund score, a relationship status, a sport or a television show.

13. The system of claim 11, wherein at least one of the profile parameters is:
a number of peer users in an online community who are associated with the user in the online community as friends, or
usage data of the user in the online community, the usage data including at least one of a date of creation of an online community account of the user, frequency of access to the online community account of the user, last login data and time of the online community account of the user; frequency of access of a gaming application in the online community using the online community account of the user, or a level of play of the user inside the gaming application.

14. The system of claim 11, wherein at least one of the plurality of profile parameters is a peer user profile parameter of a peer user who is associated with the user in an online community.

15. The system of claim 14, wherein the peer user is associated with the user in the online community as a friend of the user in the online community, a colleague of the user in the online community, or a relative of the user in the online community.

16. The system of claim 11, wherein the networking platform comprises a social networking platform.

17. The system of claim 11, wherein the processor is further configured to allow the user to perform an online transaction associated with at least one of buying, selling, transferring, returning or refunding of at least one of real goods, virtual goods, a service, a real currency, or a virtual currency.

18. The system of claim 11, wherein the processor is further configured to:
determining a refund score based on refund statistics associated with the user or a peer user associated with the user in an online community, wherein the refund statistics is associated with refunding of at least one of a real good, a virtual good, a service, a real currency, or a virtual currency to an online merchant.

19. The system of claim 11, wherein the risk parameter of the user corresponds to a predefined risk score level of at least one predefined risk score level defined by one of an online merchant or the networking platform.

20. The system of claim 11, wherein the application is one of a social networking application or a gaming application.

* * * * *